(12) United States Patent
Yoo et al.

(10) Patent No.: US 10,650,779 B2
(45) Date of Patent: May 12, 2020

(54) IMAGE PROCESSING APPARATUS AND RECORDING MEDIUM

(71) Applicant: SAMSUNG ELECTRONICS CO., LTD., Suwon-si (KR)

(72) Inventors: Seok-bong Yoo, Suwon-si (KR); Hyung-jun Lim, Seoul (KR); Gi-yeong Gim, Yongin-si (KR); Young-su Moon, Seoul (KR); Tae-gyoung Ahn, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/695,549

(22) Filed: Sep. 5, 2017

(65) Prior Publication Data
US 2018/0068634 A1    Mar. 8, 2018

(30) Foreign Application Priority Data

Sep. 7, 2016   (KR) .......................... 10-2016-0115104

(51) Int. Cl.
```
G09G 5/00      (2006.01)
G06T 5/00      (2006.01)
H04N 7/01      (2006.01)
G06T 3/40      (2006.01)
G06T 5/20      (2006.01)
G06T 1/20      (2006.01)
```

(52) U.S. Cl.
CPC .............. *G09G 5/006* (2013.01); *G06T 1/20* (2013.01); *G06T 3/4053* (2013.01); *G06T 5/002* (2013.01); *G06T 5/20* (2013.01); *H04N 7/0117* (2013.01); *H04N 7/0135* (2013.01)

(58) Field of Classification Search
CPC ......... G09G 5/006; G06T 5/20; G06T 3/4053; G06T 5/002; G06T 1/20; H04N 7/0117; H04N 7/0135
See application file for complete search history.

(56) References Cited

U.S. PATENT DOCUMENTS

| | | | | |
|---|---|---|---|---|
| 6,340,994 B1 * | 1/2002 | Margulis | ................... | G09G 3/20 348/625 |
| 6,456,340 B1 * | 9/2002 | Margulis | ................... | G06T 1/20 345/501 |

(Continued)

FOREIGN PATENT DOCUMENTS

GB      2516110 A      1/2015

OTHER PUBLICATIONS

Communication issued by the International Searching Authority dated Jan. 11, 2018 in counterpart International Patent Application No. PCT/KR2017/009686 (PCT/ISA/210 & PCT/ISA/237).

(Continued)

*Primary Examiner* — Jose R Soto Lopez
(74) *Attorney, Agent, or Firm* — Sughrue Mion, PLLC

(57) ABSTRACT

An image processing apparatus includes: a signal receiver configured to receive an input image; an image processor configured to process the input image and generate an output image; a storage configured to store a first patch corresponding to a first pixel of the input image; and a controller configured to control the image processor to generate the output image by applying the first patch stored in the storage to the first pixel.

18 Claims, 12 Drawing Sheets

(56) References Cited

U.S. PATENT DOCUMENTS

| | | | | |
|---|---|---|---|---|
| 7,668,398 | B2* | 2/2010 | Collins | G06T 3/40 345/204 |
| 8,675,999 | B1* | 3/2014 | Liang | G06T 3/4053 382/299 |
| 8,861,893 | B2* | 10/2014 | Chen | G06T 3/4053 382/299 |
| 2005/0024391 | A1* | 2/2005 | Damera-Venkata | G06T 5/50 345/698 |
| 2006/0245666 | A1* | 11/2006 | Petrosyan | G06T 5/002 382/275 |
| 2007/0041663 | A1* | 2/2007 | Cho | G06K 9/6857 382/299 |
| 2007/0097164 | A1* | 5/2007 | Marumoto | B41J 29/38 347/15 |
| 2008/0150955 | A1* | 6/2008 | Ndjiki-Nya | G06T 11/001 345/582 |
| 2010/0074549 | A1* | 3/2010 | Zhang | G06T 3/4053 382/263 |
| 2011/0142330 | A1* | 6/2011 | Min | G06T 3/4046 382/159 |
| 2011/0205227 | A1* | 8/2011 | Fischer | G06T 5/50 345/419 |
| 2011/0317770 | A1* | 12/2011 | Lehtiniemi | H04N 19/44 375/240.25 |
| 2012/0086850 | A1* | 4/2012 | Irani | G06T 3/4053 348/441 |
| 2012/0114226 | A1* | 5/2012 | Kameyama | G06K 9/00221 382/155 |
| 2012/0121179 | A1* | 5/2012 | Keshet | G06T 5/002 382/169 |
| 2012/0281923 | A1* | 11/2012 | Irani | G06K 9/3241 382/218 |
| 2012/0328210 | A1* | 12/2012 | Fattal | G06T 3/403 382/264 |
| 2013/0034299 | A1* | 2/2013 | Lin | G06N 20/00 382/162 |
| 2013/0071040 | A1* | 3/2013 | Jin | G06T 3/4053 382/254 |
| 2013/0128111 | A1* | 5/2013 | Corral-Soto | H04N 7/0125 348/441 |
| 2013/0170767 | A1* | 7/2013 | Choudhury | G06T 3/4053 382/260 |
| 2014/0055632 | A1* | 2/2014 | Lelescu | G06T 3/4053 348/218.1 |
| 2014/0078346 | A1* | 3/2014 | Imade | G06T 3/4053 348/234 |
| 2014/0093185 | A1 | 4/2014 | Liang et al. | |
| 2014/0119456 | A1* | 5/2014 | Bivolarsky | H04N 19/46 375/240.25 |
| 2014/0267372 | A1* | 9/2014 | Chaji | G09G 3/2007 345/606 |
| 2014/0270566 | A1* | 9/2014 | Tao | G06T 3/4053 382/263 |
| 2014/0301661 | A1* | 10/2014 | Voronov | G06T 3/4053 382/275 |
| 2014/0368509 | A1* | 12/2014 | Lin | G06T 3/40 345/428 |
| 2014/0368549 | A1* | 12/2014 | Lin | G06T 3/40 345/660 |
| 2015/0023611 | A1* | 1/2015 | Salvador | G06T 3/4053 382/263 |
| 2015/0036943 | A1* | 2/2015 | Lin | G06T 5/003 382/264 |
| 2015/0071545 | A1* | 3/2015 | Yang | G06K 9/46 382/190 |
| 2015/0093045 | A1* | 4/2015 | Turkan | G06T 3/4076 382/299 |
| 2015/0104116 | A1* | 4/2015 | Salvador | G06T 3/4053 382/300 |
| 2015/0213579 | A1* | 7/2015 | Alacoque | G06T 3/4053 382/300 |
| 2015/0213581 | A1* | 7/2015 | Lee | G06T 5/003 382/254 |
| 2015/0269708 | A1* | 9/2015 | Porikli | G06T 3/4007 382/160 |
| 2015/0324953 | A1* | 11/2015 | Salvador Marcos | G06T 3/4053 382/300 |
| 2016/0027152 | A1* | 1/2016 | Hsieh | G06T 5/00 382/254 |
| 2016/0048946 | A1* | 2/2016 | Asano | H04N 1/387 382/162 |
| 2016/0063677 | A1* | 3/2016 | Deamo | G06T 3/4053 382/199 |
| 2016/0078600 | A1* | 3/2016 | Perez Pellitero | G06T 3/4053 382/155 |
| 2016/0086317 | A1* | 3/2016 | Oron | G06T 5/002 382/275 |
| 2016/0165178 | A1* | 6/2016 | al-Salem | G06K 9/6249 348/441 |
| 2016/0171715 | A1* | 6/2016 | Matson | G06T 3/4053 382/103 |
| 2017/0032501 | A1* | 2/2017 | Kusumi | G06T 5/002 |
| 2017/0041571 | A1* | 2/2017 | Tyrrell | H04N 5/37455 |
| 2017/0132759 | A1* | 5/2017 | Perez Pellitero | G06K 9/42 |
| 2017/0132763 | A1* | 5/2017 | Salvador Marcos | G06T 5/002 |
| 2017/0140506 | A1* | 5/2017 | Sato | H04N 7/01 |
| 2017/0169545 | A1* | 6/2017 | Turkan | G06T 3/4076 |
| 2017/0206632 | A1* | 7/2017 | Milanfar | G06T 3/403 |
| 2017/0244908 | A1* | 8/2017 | Flack | G06K 9/00234 |
| 2017/0256033 | A1* | 9/2017 | Tuzel | G06K 9/00255 |
| 2018/0061302 | A1* | 3/2018 | Hu | G09G 3/2074 |
| 2018/0139458 | A1* | 5/2018 | Wang | H04N 19/33 |
| 2018/0232853 | A1* | 8/2018 | Kim | G06T 3/403 |
| 2019/0012768 | A1* | 1/2019 | Tafazoli Bilandi | G06K 9/4628 |
| 2019/0124292 | A1* | 4/2019 | Yumoto | G06T 5/50 |

OTHER PUBLICATIONS

Communication dated Apr. 5, 2019, issued by the European Patent Office in counterpart European Application No. 17849055.3.

Pham, et al., "Adaptive Guided Image Filtering for Sharpness Enhancement and Noise Reduction", Nov. 20, 2011, Proc. Int. Conf. Adv. Biometrics (ICB), XP047469959, p. 323-334, 12 pages total.

Hegde et al., "Efficient Upsampling of Natural Images", Jan. 1, 2015, Technical Report : Mitsubishi Electric Research Laboratories, merl.com, XP009512185, retrieved from URL:https://www.merl.com/publications/docs/TR2015-036.pdf, (10 pages total).

He, et al., "Guided Image Filtering", Jun. 1, 2013, IEEE Transactions on Pattern Analysis and Machine Intelligence, vol. 35, No. 6, XP055553272, (13 pages total).

Yoo & Han, "Efficient Texture Creation Based on Random Patches in Database and Guided Filter", Nov. 2018, IEICE Trans. Inf. & Syst., vol. E101-D, No. 11, XP009512183, retrieved from URL:http://eolit-p.internal.epo.org/api/orders/559840/pdf, pp. 2840-2843 (4 pages total).

Communication dated Sep. 4, 2019, issued by the European Patent Office in counterpart European Application No. 17849055.3.

\* cited by examiner $$R_{(n)} = \frac{E_{(n)}\left[(X_t - \mu)(X_{t+n} - \mu)\right]}{\sigma^2}$$

Random Patch, X

IMAGE PROCESSING APPARATUS AND RECORDING MEDIUM

CROSS-REFERENCE TO RELATED THE APPLICATION

This application claims priority from Korean Patent Application No. 10-2016-0115104 filed on Sep. 7, 2016 in the Korean Intellectual Property Office, the disclosure of which is incorporated herein by reference in its entirety.

BACKGROUND

Field

Apparatuses and methods consistent with the exemplary embodiments relate to an image processing apparatus, which processes an image signal of an input image from a content source, and a recording medium.

Related Art

To compute and process predetermined information in accordance with certain processes, an electronic apparatus includes a central processing unit (CPU), a chipset, a memory, and similar electronic components for computation. Such an electronic apparatus may be diversely classified in accordance with what information will be processed therein. For example, the electronic apparatus may be classified into an information processing apparatus such as a personal computer, a server or the like for processing general information, or an image processing apparatus for processing image information.

The image processing apparatus receives a content signal including video data and processes the video data extracted from the content signal in accordance with various image processing processes. The image processing apparatus may display an image based on the processed video data on its own display, or output the processed video data to another display apparatus. As an example of an image processing apparatus that has no display, there is a set-top box. An image processing apparatus that has a display may be called a display apparatus, and may for example be a television (TV), a monitor, a portable multimedia player (PMP), a tablet computer, a mobile phone, etc.

With development of technology, a display panel for supporting an ultra-high definition (UHD) resolution has been applied to the display apparatus. Recently, a display panel for 8K UHD, as well as 4K UHD, has been released. However, an input image given to the display apparatus may not be sufficiently high in resolution to match the high resolution display panel. For example, an input image of full high definition (FHD) may be given to a TV having a display panel for supporting UHD. To display the input image in this case, the display apparatus may upscale the input image into an output image having a higher resolution and enhance detail of the output image during the upscaling to improve the output image.

However, such a process for enhancing the detail may cause two problems. One is a flicker due to an inconsistent time between image frames, and the other is noise due to a low spatial correlation within one image frame. Therefore, there is a need of an improved display apparatus or the image processing apparatus.

SUMMARY

According to an aspect of an exemplary embodiment, there is provided an image processing apparatus including: a signal receiver configured to receive an input image; an image processor configured to process the input image and generate an output image; a storage configured to store a first patch corresponding to a first pixel of the input image; and a controller configured to control the image processor to generate the output image by applying the first patch stored in the storage to the first pixel.

The first patch may be one among a plurality of patches respectively corresponding to a plurality of pixel values, each of the plurality of patches may include a plurality of patch values respectively corresponding to positions of pixels proximate an area to which the patch is applied, and the controller may be further configured to determine the first patch based on a pixel value of the first pixel.

The controller may be further configured to apply the first patch to an area larger than the first pixel.

The first patch may be configured to be applied to an area having a matrix form of 7*7.

The controller may be further configured to apply the plurality of patches to respective pixels of the input image such that the plurality of patches overlap, and generate the output image by calculating an average of a plurality of overlapping patch values with regard to the respective pixels.

The plurality of patch values within one patch may have a correlation of 0 therebetween.

At least one among the plurality of patches may be determined based on a preset random-number algorithm, and remaining patches of the plurality of patches may be generated based on linear interpolation.

The controller may be further configured to convert a texture generated by applying the plurality of patches to respective pixels of the input image into a revised texture through guided filtering based on the input image, and generate the output image by combining the input image with the revised texture.

The controller may be further configured to apply a smoothing filter to the input image, and apply the first patch to the input image which has been subject to the smoothing filter.

According to an aspect of another exemplary embodiment, there is provided a non-transitory recording medium for storing a program code of a method executable by a processor of an image processing apparatus, the method including: receiving an input image; acquiring a first patch corresponding to a first pixel; and generating an output image by applying the first patch to the first pixel.

The first patch may be one among a plurality of patches respectively corresponding to a plurality of pixel values, each of the plurality of patches may include a plurality of patch values respectively corresponding to positions of pixels proximate an area to which the patch is applied, and the generating the output image may include determining the first patch based on a pixel value of the first pixel.

The first patch may be applied to an area larger than the first pixel.

One patch may be provided to be applied to the area having a matrix form of 7*7.

The generating the output image may include: applying the plurality of patches to respective pixels of the input image such that the plurality of patches overlap; and generating the output image by calculating an average of a plurality of overlapping patch values with regard to the respective pixels.

The plurality of patch values within one patch may have a correlation of 0 therebetween.

At least one among the plurality of patches may be determined based on a preset random-number algorithm, and wherein remaining patches of the plurality of patches may be generated based on linear interpolation.

The first patch may be one among a plurality of patches respectively corresponding to a plurality of pixel values, and the generating the output image may include: converting a texture generated by applying the plurality of patches to respective pixels of the input image into a revised texture through guided filtering based on the input image; and generating the output image by combining the input image with the revised texture.

The generating the output image may include: applying a smoothing filter to the input image; and applying the first patch to the input image which has been subject to the smoothing filter.

According to an aspect of yet another exemplary embodiment, there is provided an image processor including: a memory including a plurality of patches respectively corresponding to a plurality of pixel values; and at least one processor configured to determine a first patch among the plurality of patches based on a first pixel value of a first pixel of an image; and generate an output image by applying the first patch to the first pixel and a second pixel of the image adjacent to the first pixel.

The at least one processor may be further configured to determine a second patch among the plurality of patches based on a second pixel value of the second pixel and generate the output image by applying the first patch and the second patch to the first pixel and the first patch and the second patch to the second pixel.

The first patch may include a first block and a second block, and the second patch may include a first block and a second block, and the at least one processor may be further configured to apply the first block of the first patch and the first block of the second patch to the first pixel and apply the second block of the first patch and the second block of the second patch to the second pixel.

The at least one processor may be further configured to filter a texture of the output image to generate a revised texture and generate the output image by combining the image with the revised texture.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc., is employed for describing variety of elements, and the terms are used for distinguishing between one element and another element. Therefore, the meanings of the elements are not limited by the terms, and the terms are also used just for explaining the corresponding exemplary embodiment.

Figure 1:
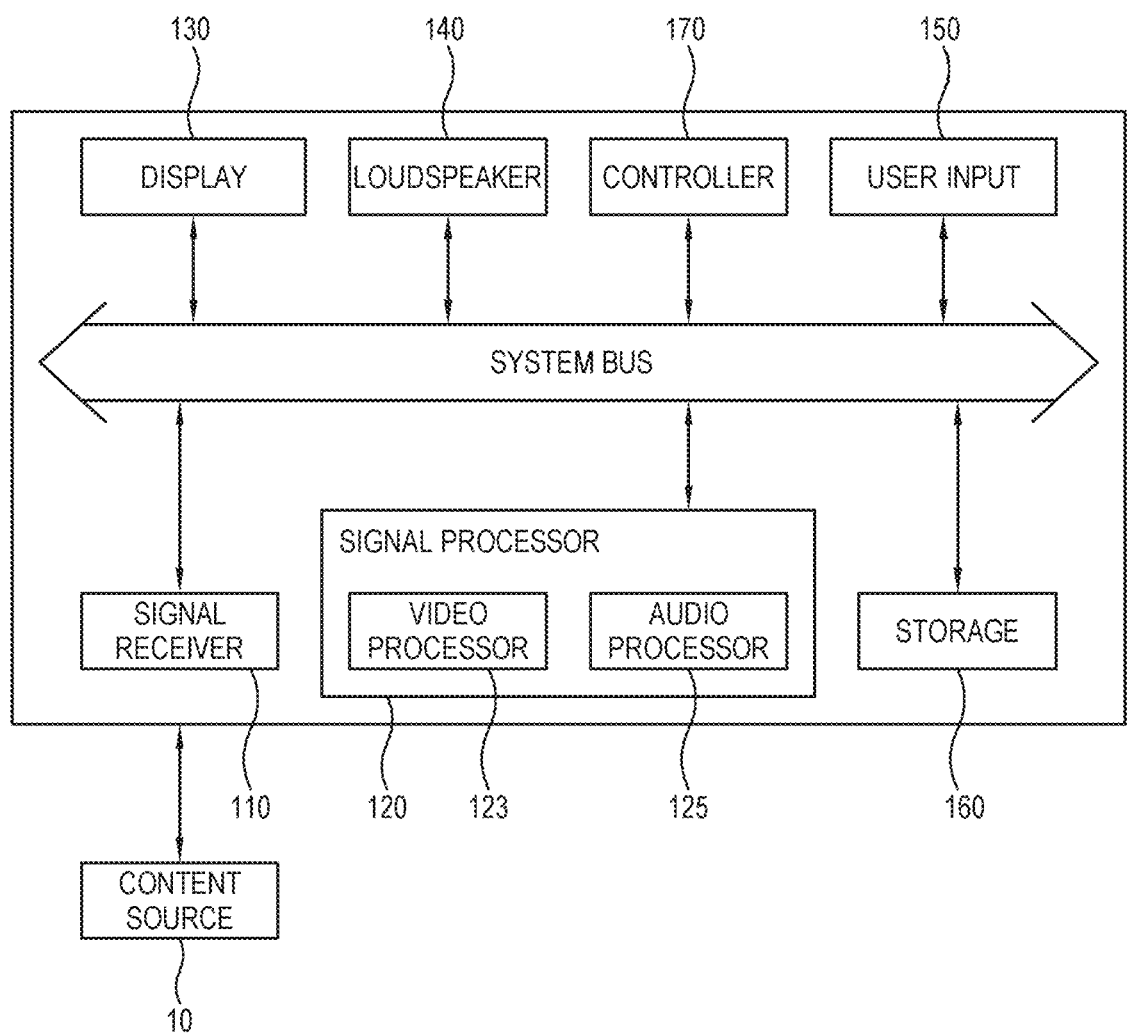
FIG. 1 is a block diagram of an image processing apparatus according to an exemplary embodiment.

FIG. 1 is a block diagram of an image processing apparatus according to an exemplary embodiment.

As shown in FIG. 1, the image processing apparatus 100 according to an exemplary embodiment receives a content signal from various content sources 10. In this exemplary embodiment, the image processing apparatus 100 is achieved by a TV or similar display apparatus. Alternatively, the image processing apparatus 100 may be achieved by a set-top box having no display 130. Besides, exemplary embodiments may be applied to a tablet computer, a personal computer (PC), a mobile phone, a wearable device, or another similar apparatus that can process a content signal and display a content image.

The image processing apparatus 100 includes a signal receiver 110 for receiving a content signal from the content source 10, a signal processor 120 for processing the content signal received by the signal receiver 110, a display 130 for displaying a content image based on the content signal processed by the signal processor 120, a loudspeaker 140 for outputting a content sound based on the content signal processed by the signal processor 120, a user input 150 for receiving a user's input, a storage 160 for storing data, and a controller 170 for performing calculations for the process of the signal processor 120 and control for general operations of the image processing apparatus 100. These elements are connected to one another through a system bus.

The signal receiver 110 includes a communication module for receiving a content signal from the content source 10, or other external apparatus. The signal receiver 110 is an element for receiving a signal or data from the exterior, but is not limited thereto. Alternatively, the signal receiver 110 may be used for interactive communication. For example, the signal receiver 110 includes at least one among elements such as a tuning chip to be tuned to a frequency designated for a radio frequency (RF) broadcast signal, an Ethernet module to receive packet data from the Internet by a wire, a wireless communication module to wirelessly receive packet data in accordance with various standards such as Wi-Fi, Bluetooth, etc., a connection port to which a universal serial bus (USB) memory or other similar external memory is connected, etc. That is, the signal receiver 110 includes a data input interface where communication modules or ports respectively corresponding to various kinds of communication protocols are combined.

The signal processor 120 performs various processes with respect to a content signal received by the signal receiver 110 so that content can be reproduced. The signal processor 120 includes a hardware processor realized by a chipset, a buffer, a circuit, or similar component mounted to a printed circuit board, and may be designed as a system on chip (SoC) as necessary. Fundamentally, the signal processor 120 processes a content signal so that a content image can be displayed on the display 130 and a content sound can be output through the loudspeaker 140.

The signal processor 120 includes a video processor 123 for processing a video signal of a content signal by a video processing process so that a content image can be displayed on the display 130, and an audio processor 125 for processing the audio signal of the content image by an audio processing process so that a content sound can be output from the loudspeaker 140.

The video processor 123 is achieved by a hardware processor chip, and performs the video processing process such as decoding, image enhancement, scaling, etc., with regard to a video signal, thereby outputting the processed video signal to the display 130. As necessary, the video processor 123 may be achieved by a combination of processor chips.

The audio processor 125 is achieved by a hardware digital signal processor (DSP), and performs the audio processing process such as channel division, amplification, volume control, etc., with regard to an audio signal, thereby outputting the processed audio signal to the loudspeaker 140. If the loudspeaker 140 includes a plurality of unit loudspeakers, the audio processor 125 may divide and process the audio signal according to channels, and respectively output the processed signals to the unit loudspeakers according to the channels.

In this exemplary embodiment, the signal processor 120 includes the video processor 123 and the audio processor 125, but exemplary embodiments are not limited thereto. Alternatively, the signal processor 120 structure may vary. For example, the signal processor 120 may include the video processor 123, the storage 160 and the controller 170 which are provided as a single chip.

The display 130 displays an image based on a video signal processed by the video processor 123. There are no limits to the type of the display 130, and the display 130 may have a light receiving structure such as a liquid crystal display (LCD) panel, or a self-emissive structure such as an organic light emitting diode (OLED). Further, the display 130 may further include additional components. For example, if the display 130 includes an LCD panel, the display 130 may include a backlight unit for emitting light and a panel driving substrate for driving the LCD panel, etc.

The loudspeaker 140 outputs a sound based on audio data processed by the signal processor 120. The loudspeaker 140 includes a unit loudspeaker which may output audio data of one audio channel. For example, if multiple unit loudspeakers are included in the loudspeaker 140, audio data having a plurality of audio channels may be output through the unit loudspeakers of the loudspeaker 140.

The user input 150 transmits various preset control command or information to the controller 170 in response to a user's control or input. That is, the user input 150 sends the signal processor 120 various events caused by a user's control corresponding to a user's intention, so that the controller 170 can operate corresponding to the event.

The user input 150 may be variously achieved in accordance with information input methods. For example, the user input 150 includes user interface environments installed in the image processing apparatus 100, such as a key provided in an outer side of the image processing apparatus 100, a touch screen provided in the display 130, a microphone for receiving a user's voice, a camera or sensor for photographing or sensing a user's gesture or the like, etc. A remote controller may be an example of the user interface environments. The remote controller is separately provided from a main body of the image processing apparatus 100, and therefore transmits a control signal to the image processing apparatus 100 through a separate control signal receiver provided in the main body of the image processing apparatus 100.

The storage 160 stores various pieces of data under the processes of the signal processor 120 and the control of the controller 170. The storage 160 is accessed by the signal processor 120 and the controller 170 so that the data can be read, written, modified, updated and so on. The storage 160 includes a nonvolatile memory such as a flash memory, a hard disc drive (HDD), a solid state drive (SSD) or the like to retain data regardless of whether the image processing apparatus 100 is powered on or off; and a volatile memory such as a buffer, a random access memory (RAM), or the like to which data to be processed by the signal processor 120 is temporarily loaded.

The controller 170 is achieved by a central processing unit (CPU), a microprocessor, etc., and thus controls operations of elements such as the signal processor 120 in the image processing apparatus 100.

With this structure, the image processing apparatus 100 extracts an image signal from a content signal received from the content source 10, and processes the extracted image signal, thereby displaying an image. That is, the image processing apparatus 100 converts an input image of the image signal into an output image in accordance with image processing processes, and displays the converted output image on the display 130. While converting the input image into the output image, the image processing apparatus 100 generates the output image by adjusting a resolution of the input image to match with a resolution supported by the display 130.

If the resolution of the input image is higher than the resolution supported by the display 130, the image processing apparatus 100 performs downscaling to decrease the resolution of the input image so that the output image can be adjusted to a resolution supported by the display 130.

On the other hand, if the resolution of the input image is lower than the resolution supported by the display 130, the image processing apparatus 100 performs upscaling to increase the resolution of the input image. In the upscaling, the input image has lower quality than the output image, and detail is added to the input image. If the input image is converted into the output image without detail enhancement, a user may appreciably perceive the decreased quality of the finally-displayed output image.

Various techniques have been proposed for enhancing the detail of the input image. For example, a high-frequency component of the input image may be reinforced to enhance the detail of the input image and thus improve the definition and delicacy of the output image.

A high-frequency component plays a role in a certain image as follows. In terms of a distribution of pixels included in an image, if there is a relatively small difference in pixel value between two pixels adjacent to each other throughout the image, the image includes relatively many low-frequency components. On the other hand, if there is a relatively big difference in pixel value between two pixels adjacent to each other throughout the image, the image includes relatively many high-frequency components. When an image includes relatively many high-frequency components, the image is displayed as detailed as the number of high-frequency components. As a representative example of the high-frequency component displayed in the image, there is an edge of an object in the image.

According to a method, the image processing apparatus generates a high-frequency component based on a coefficient of a low-frequency component of an input image to thereby generate a texture with a high-frequency component, and combines the generated texture with the original input image to thereby obtain a detail-enhanced output image. This method is called a frequency lifting method. For example, the image processing apparatus converts the input image for a frequency domain through 2D discrete cosine transform (DCT), copies a low-frequency component to a high-frequency band to thereby generate a new high-frequency component, and converts the frequency domain into a spatial domain through 2D inverse discrete cosine transform (IDCT) to thereby obtain a texture.

According to another method, the image processing apparatus generates a texture based on white noise. For example, the image processing apparatus extracts a high-frequency component from an input image, adds white noise generated by a preset manner to the high-frequency component, and shifts a phase of the high-frequency component with the added white noise to thereby generate a texture. Then, the image processing apparatus combines the generated texture with the original input image.

However, in the frequency lifting method, the components added in the frequency domain of the input image are coefficients of a low frequency band irrelevant to a high frequency band. Further, in the white noise method, the white noise added to the existing high-frequency component is also irrelevant to the original input image. Therefore, when the texture generated for detail enhancement is combined with the original input image, a correlation between the input image and the texture may be drastically decreased. In this case, an actually displayed output image involves noise.

Besides, if a correlation between the input image and the texture is low, there is a lack of consistency between temporarily successive image frames. This makes a user perceive a flicker while the output image is displayed.

Thus, if resolution of an input image is lower than a resolution supported by the display, the image processing apparatus according to an exemplary embodiment generates a detail-enhanced output image by applying upscaling to an input image for the resolution of the display, generating a texture in accordance with image characteristics and combining the texture with the input image. To this end, the image processing apparatus stores a plurality of patches respectively corresponding to a plurality of possible pixel values that pixels of the input image can have. One patch includes the plurality of patches respectively corresponding to the plurality of pixels included in the input image. The term 'patch' is adopted for convenience by taking a function into account, and therefore various terms besides the 'patch' may be used for this exemplary embodiment. For example, the patch may be called a mask because each patch has a structure where a plurality of patch values are arranged having a matrix form in units of pixel.

That is, with regard to each pixel of the input image, the image processing apparatus generates a texture by performing calculations based on the patch in units of pixel area including the corresponding pixel.

Accordingly, the image processing apparatus minimizes noise in an output image by increasing a correlation between an input image and a texture, and prevents a flicker by increasing consistency between temporarily successive image frames. Below, this exemplary embodiment will be further described.

Figure 2:
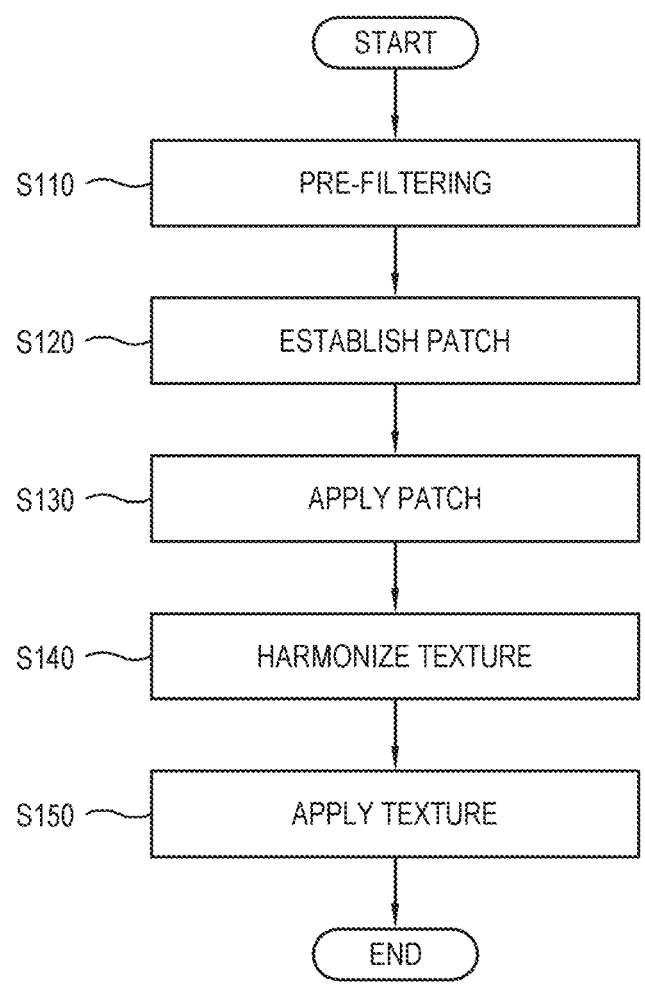
FIG. 2 is a flowchart of converting an input image into a detail-enhanced output image according to an exemplary embodiment.

FIG. 2 is a flowchart of converting an input image into an output image improved in detail by the image processing apparatus according to an exemplary embodiment.

As shown in FIG. 2, the image processing apparatus converts an input image into a detail-enhanced output image by combining the input image with a texture. For example, the image processing apparatus sequentially performs processes including the steps of applying pre-filtering to the input image (S110), establishing a patch for building a database of the patch corresponding to a pixel based on a random number (S120), applying the patch for generating an initial texture by applying the patch corresponding to the pixel of the database with regard to each pixel of the input image (S130), harmonizing the texture for generating a revised texture by making the initial texture harmonize with the original input image (S140), and applying the revised texture for generating an output image by combining the revised texture with the input image (S150).

Below, the respective steps will be described in detail.

The pre-filtering step S110 corresponds to a previous job before performing the substantial process, as the first step of the processes for converting the input image into the output image. In this step, the image processing apparatus removes noise involved in or standing out from the input image. If this noise is not removed, it may unpredictably affect subsequent steps. Therefore, this step is to exclude such possibility of noise. Alternatively, this step may be not carried out in accordance with conditions where no noise stands out from the input image or the like.

In the pre-filtering step S110, the image processing apparatus may for example apply a smoothing filter to an input image. The smoothing filter may employ various kinds of technique such as a Gaussian smoothing filter, etc.

The patch establishing step S120 corresponds to a job of previously building a database of patches respectively corresponding to effective pixels of an input image. This step may be performed after the pre-filtering step S110, but also may be performed before the process of converting an input image into an output image. That is, the database is previously built and stored, and the image processing apparatus calls for the database previously stored in the step S120. The database may be generated and stored by the image processing apparatus' own calculations, but exemplary embodiments are not limited thereto. Alternatively, a manufacturer of the image processing apparatus may store the database in the image processing apparatus during a manufacturing process.

In case of processing an 8-bit input image, the image processing apparatus acquires patches respectively corresponding to pixel values of 0 to 255 from the database. The patch corresponding to a certain pixel value is given in the form of a matrix having m*n blocks, where m and n are preset integers. According to an exemplary embodiment, the matrix may have n*n blocks. One block corresponds to one pixel, and a plurality of blocks in the patch respectively correspond to pixels of an image. The block in one patch has a predetermined value based on a random-number algorithm, and such a patch will be further described below in more detail.

The patch applying step S130 corresponds to a job of acquiring the patch from the previously prepared database, and applying the patch to each pixel of the input image. Because the patches of the database are provided corresponding to pixel values, the image processing apparatus determines a pixel value of each pixel of an input image, and reflects the patch corresponding to the determined pixel value in a relevant pixel. Specifically, the image processing apparatus arranges the patch so that a center block among the plurality of blocks of the patch corresponds to the relevant pixel, and performs such a job with regard to all the pixels of the input image. In result, at most (n*n) blocks of the patch are stacked with regard to a certain pixel, and thus the image processing apparatus obtains an average value of the values of the blocks stacked with respect to the pixel. The image processing apparatus generates an initial texture based on the average values with respect to all the pixels.

The texture harmonizing step S140 corresponds to a job of harmonizing the initial texture with the input image by applying guided filtering to the initial texture. That is, a guidance image for the guided filtering becomes an input image. The image processing apparatus increases a correlation between the initial texture and the input image through the guided filtering, thereby converting the initial texture into a revised texture. The guided filtering will be further described below in more detail.

The texture applying step S150 corresponds to a job of finally converting the input image into an output image by combining the revised texture with the input image. The revised texture obtained by the foregoing steps involves a high-frequency component enhanced adaptively to the input image, and therefore the output image obtained by combining the input image and the revised texture is also more enhanced in a high-frequency component than the input image. In contrast to enhancing just the high-frequency component as discussed above, the revised texture according to an exemplary embodiment is a product of adaptive processes to the input image. Accordingly, the output image minimizes decrease in temporal consistency and a spatial correlation.

Thus, the image processing apparatus according to an exemplary embodiment minimizes a flicker or noise in an output image caused by the upscaling, thereby improving the quality of the output image.

Below, a method of building a database of a patch will be described.

Figure 3:
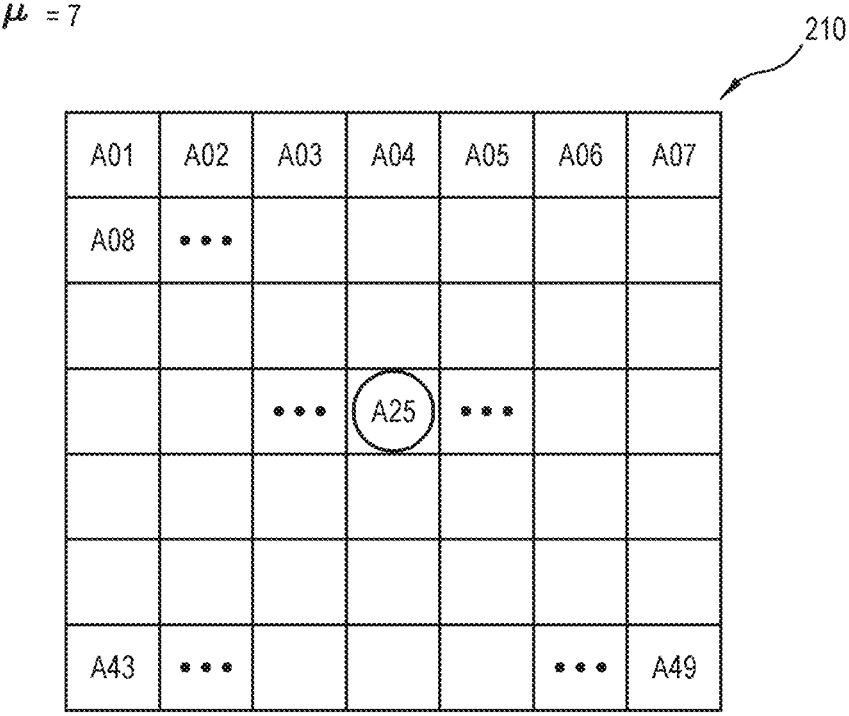
FIG. 3 shows an example of a patch applied to the image processing apparatus according to an exemplary embodiment.

FIG. 3 shows an example of a patch applied to the image processing apparatus according to an exemplary embodiment.

As shown in FIG. 3, a patch 210 corresponding to a certain pixel value is given in the form of a matrix having n*n blocks. If n=7, one patch 210 includes a total of 49 blocks from A01 to A49, and each block corresponds to a position of one pixel. In other words, when the patch 210 is applied to one pixel of an input image, the patch 210 is applied to not only the one pixel but also 48 pixels around the one pixel.

The size of the patch 210, i.e., the number of blocks involved in the patch 210 may vary. If the size of the patch 210 increases, an output image is enhanced in delicacy and definition but a flicker may increase and a load and a memory needed for the process may increase. On the other hand, if the size of the patch 210 decreases, an output image is reduced in delicacy and definition, but a flicker may decrease and a load and a memory needed for the process may be decreased.

In the patch 210 of FIG. 3, the leftmost and uppermost block is 'A01,' the next block to the right is 'A02,' and the other blocks are sequentially assigned with 'A03,' 'A04,' and so on. In this manner, the rightmost and lowermost block is 'A49.' Such numbering is used just for convenience to easily indicate a block at a certain position within the patch 210.

When the patch 210 is applied to a certain pixel in the input image, a certain block among the plurality of block involved in the patch 210 is used as a reference block applied corresponding to the target pixel, and the other blocks are respectively applied to pixels around the target pixel in accordance with relative positions. It may be variously designed what block will be used as the reference block among the blocks of the patch 210. For example, the reference block may be the block corresponding to the position A01, or the block corresponding to the position A07 or A49.

For convenience of calculation or the like, the block positioned at the center of the patch 210, i.e., the block corresponding to the position A25 may be used as the reference block.

Below, a value of each block of the patch 210 will be described. The database of the patch 210 includes patches 210 corresponding to all the pixel values of the input image. For example, an 8-bit input image includes a total of 256 patches 210 from 0 to 255, and a 10-bit input image includes a total of 1024 patches 210 from 0 to 1023. The database may include many kinds of patches 210 in accordance with bit numbers of a support input image.

In the step of building the database, the image processing apparatus primarily generates a preset number of patches 210, and then secondarily generates the other patches 210 based on the primarily generated patches 210. The primarily generated patch 210 is called a seed patch. A method of generating the patches 210 corresponding to all the pixel values will be further described below.

The image processing apparatus assigns an arbitrary value, which is obtained by a random number algorithm under a specific condition, to each block of the patch 210. Such a value of each block is regarded as a value of the patch, and one patch 210 has a plurality of patch values. In other words, the values of the plurality of blocks in the patch 210 are not entirely random-number values but arbitrary values because they are made in consideration of various conditions such as a Minimum, a Maximum, a Mean, a Standard Deviation, etc.

As a specific condition, the values of the plurality of blocks within one patch 210 are prepared to make an average value thereof be equal to a preset target value. In other words, the values of the respective blocks of the plurality of patches 210 are prepared to have the same standard deviation. Here, the target value for the average value may be variously designed, and may be set to '0.' Further, the same standard deviation means that a value k of the block in the patch 210 satisfies −σ≤k≤σ where σ is a preset standard deviation. Further, the average value may be obtained by various mathematical means such as a geometric mean, a harmonic mean, etc. For example, the average value may be obtained by an arithmetic mean.

In this manner, the image processing apparatus may generate each seed patch. Below, a method of generating the patches corresponding to all the pixel values based on the seed patch will be described.

Figure 4:
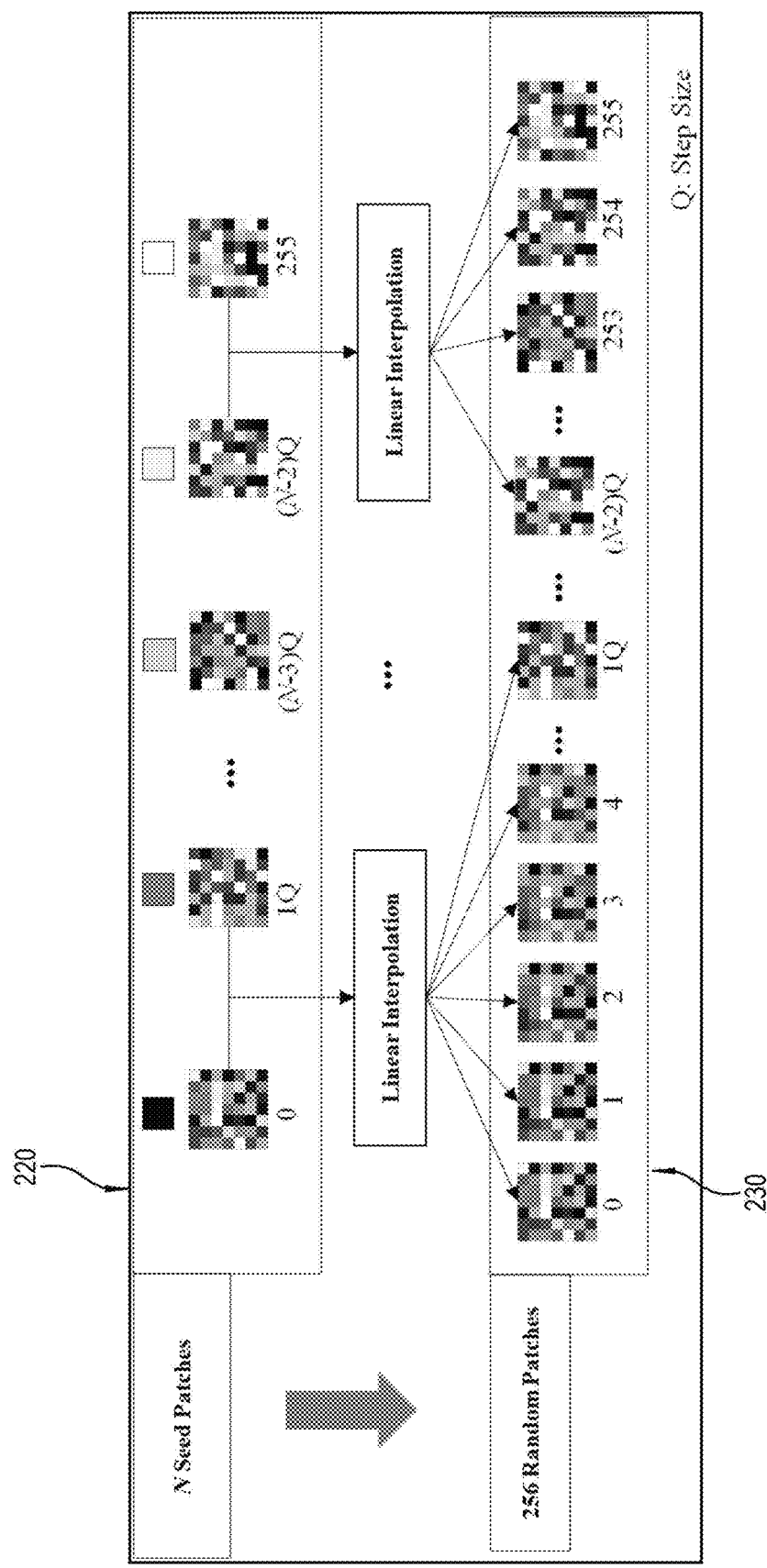
FIG. 4 shows a principle that the image processing apparatus according to an exemplary embodiment builds a database based on a seed patch.

FIG. 4 shows a principle that the image processing apparatus according to an exemplary embodiment builds a database based on a seed patch.

As shown in FIG. 4, the image processing apparatus generates N seed patches 220 within a range between '0' as the lower limit of the pixel value of the input image and 'p' as the upper limit. For example, p is equal to 255 in case of an 8-bit input image. It may be variously designed what pixel value within the range of '0' to '255' is used in generating the seed patch 220. For instance, the seed patch 220 is generated with regard to a pixel value corresponding to a multiple of Q, where Q is a predetermined integer. When Q is determined, N is also determined.

To obtain patches 230 corresponding to the other pixel values, not the pixel value corresponding to the seed patch 220, linear interpolation is used. For example, the image processing apparatus obtains patches 230 of the pixel values between 0 and Q by the linear interpolation from the seed patch 220 of the pixel value 0 and the seed patch 220 of the pixel value Q. Of course, the seed patch 220 is the patch 230 with regard to a pixel value where the seed patch 220 is already given. The image processing apparatus performs the linear interpolation based on all the seed patches 220, thereby building a database of the patch 230 corresponding to all the pixel values.

Below, a principle of the linear interpolation will be described.

The linear interpolation refers to a method of estimating a value between two end points through a linear calculation based on a linear distance when values of two arbitrary end points are given. For example, if two end points (x0, y0) and (x1, y1) are given, (x, y) between them is estimated by the following proportional expression.

$$(y-y_0)/(x-x_0)=(y_1-y_0)/(x_1-x_0)$$

$$y=y_0+(y_1-y_0)\{(x-x_0)/(x_1-x_0)\} \quad \text{[Expression 1]}$$

This principle is generalized as follows. If data values at two points $p_1$ and $p_2$ are respectively $f(p_1)$ and $f(p_2)$, a data value $f(p)$ at an arbitrary point p is obtained by the following expression.

$$f(p)=\{d_2/(d_1+d_2)\}f(p_1)+\{d_1/(d_1+d_2)\}f(p_2) \quad \text{[Expression 2]}$$

where $d_1$ is a distance from p to $p_1$, and $d_2$ is a distance from p to $p_2$.

If normalization is applied to make the sum of distances be equal to 1, i.e., $d_1+d_2=1$, the foregoing expression is simplified as follows.

$$f(p)=d_2 f(p_1)+d_1 f(p_2) \quad \text{[Expression 3]}$$

This exemplary embodiment shows the method of using the linear interpolation to acquire the patches with regard to all the pixel values from the seed patch 220. However, this is exemplary. According to other exemplary embodiment, different kinds of interpolation may be used as long as a certain point between two points can be estimated.

Below, a method where the image processing apparatus applies the patch 230 to the input image will be described.

Figure 5:
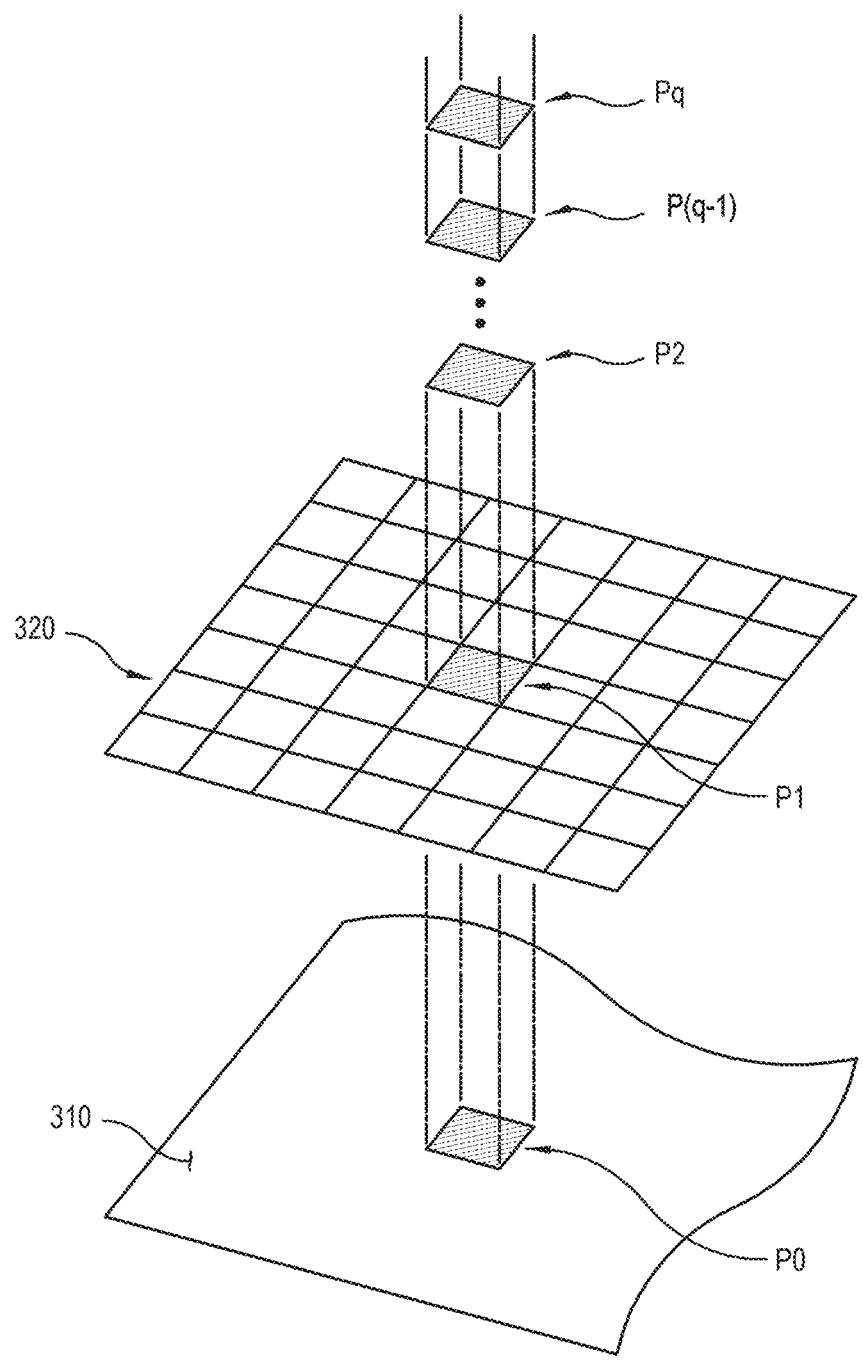
FIG. 5 shows a principle that the image processing apparatus according to an exemplary embodiment generates an initial texture by applying the patch to each pixel of the input image.

FIG. 5 illustrates generating an initial texture by applying the patch to each pixel of the input image according to an exemplary embodiment.

As shown in FIG. 5, the image processing apparatus determines a pixel value of each pixel in an input image 310. The image processing apparatus searches the database for a patch 320 corresponding to a pixel value of a pixel $P_0$, and applies the searched patch 320 to the pixel $P_0$.

As a method of applying the patch 320 to the pixel $P_0$, the image processing apparatus applies the patch 320 to the input image 310 so that the reference block $P_1$ of the patch 320 can correspond to the pixel $P_0$. That is, if the reference block $P_1$ of the patch 320 is arranged to correspond to the pixel $P_0$, the other blocks of the patch 320 are arranged to correspond to the positions of the respective pixels around the pixel $P_0$. If the patch 320 includes (n*n) blocks, the blocks of the patch 320 respectively correspond to (n*n) pixels with respect to the pixel $P_0$ of the input image 310.

In this manner, the image processing apparatus applies the patches to all the pixels of the input image 310. Then, the blocks of many patches are overlapped on the respective pixels of the input image 310. For example, the blocks $P_1$, $P_2$, ..., $P_{(q-1)}$, $P_q$ of the plurality of patches are overlapped on the pixel $P_0$. Here, q is a total number of blocks of the patch 320, and the number of blocks corresponding to the pixel may be smaller than that of another pixel in accordance with positions of the pixel within the input image 310.

The image processing apparatus averages the values of the blocks $P_1, P_2, \ldots, P_{(q-1)}, P_q$ of the plurality of overlapped patches corresponding to the pixel $P_0$ with respect to the pixel $P_0$. The image processing apparatus obtains such an average value over the whole pixels, thereby generating an initial texture based on the average values.

Below, a method of revising the initial texture by harmonizing with an original input image will be described.

Figure 6:
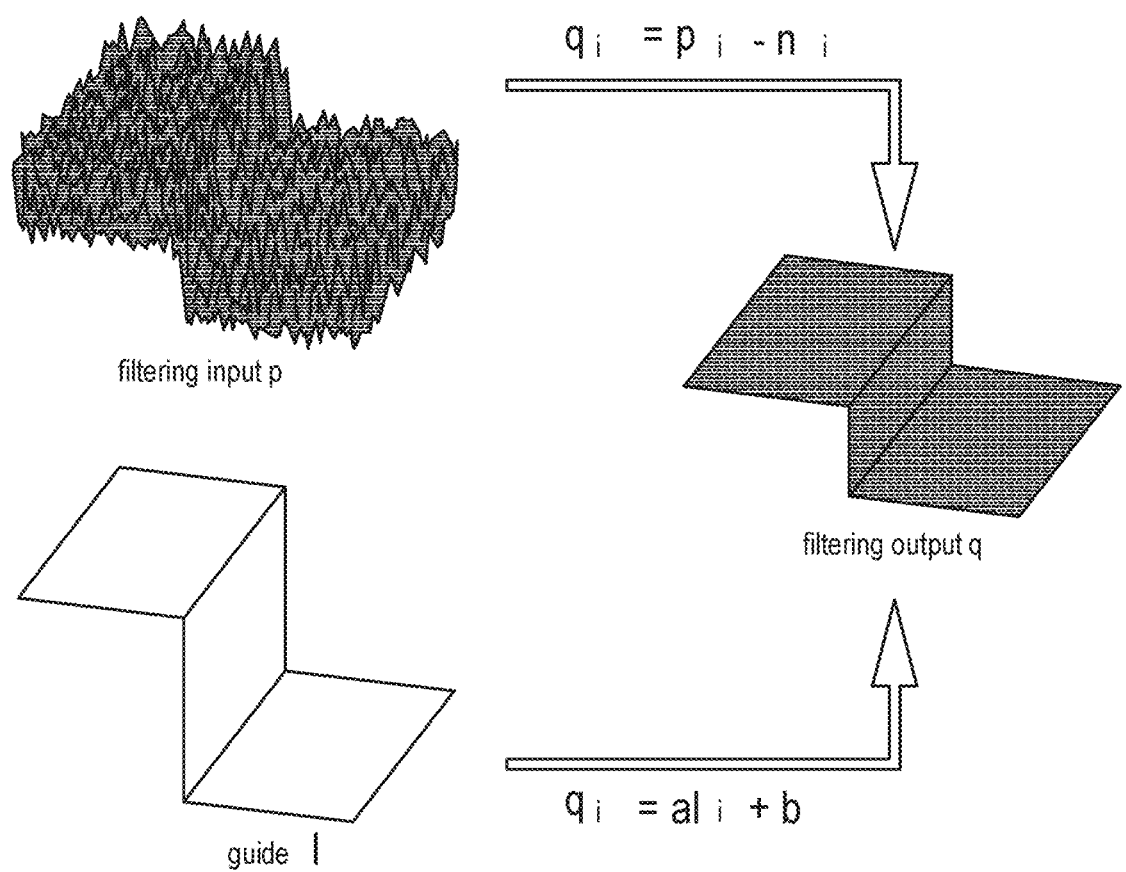
FIG. 6 shows a principle that the image processing apparatus according to an exemplary embodiment revises the initial texture based on the input image.

FIG. 6 illustrates revising the initial texture based on the input image according to an exemplary embodiment.

As shown in FIG. 6, if an initial texture is generated, the image processing apparatus applies guided filtering based on an original image, i.e., an input image to the initial texture and thus generates a revised texture. Below, the guided filtering will be described.

The guided filtering is used in fields of denoising, multiscale detail extraction, etc., and refers to a method of filtering a predetermined input as compared with preset guidance to thereby obtain an output corresponding to the guidance. In a general linear translation-variant filtering process about an guidance image I, a filtering input image p and an output image q, I and q are previously given values. A filtering output $q_i$ at the pixel i may be expressed by the following weighted average.

$$q_i=\Sigma\{W_{ij}(I)p_j\} \quad \text{[Expression 4]}$$

In Expression 4, the first term of Σ is j, and i and j are indexes of a pixel. A filter kernel $W_{ij}$ is a function of a guidance image I and independent of p. This filter is linear to p.

The major premise of the guided filter is a local linear model between the guidance I and a filtering output q. Like the following expression, q is regarded as a linear transform of I, in a window $\omega_k$ having a pixel k at the center. Here, the window refers to the patch in the guided filtering.

$$q_i=a_k I_i+b_k, \forall_i \in \omega_k \quad \text{[Expression 5]}$$

$(a_k, b_k)$ are linear coefficients which are constant in $\omega_k$. To determine the linear coefficients $(a_k, b_k)$, there is a need of a limit from a filtering input p. Like the following expression, it is possible to model the output q as an input P from which noise/texture and other unnecessary component n are removed.

$$q_i = p_i - n_i \quad \text{[Expression 6]}$$

While keeping the linear model of Expression 5, a solution is required for minimizing a difference between q and p. In particular, the following cost function is minimized in window $\omega_k$.

$$E(a_k, b_k) = \Sigma\{(a_k I_i + b_k - p_i)^2 + \in a_k^2\} \quad \text{[Expression 7]}$$

In Expression 7, the first term of the sigma operation is ($i \in \omega_k$), and $\in$ is a normalization parameter. This Expression 7 is a linear ridge regression, and its solution is as follows.

$$a_k = \{(1/|\omega|)\Sigma(I_i p_i - \mu_k P_k)\}/\sigma_k^2 + \in)$$

$$b_k = P_k - a_k \mu_k \quad \text{[Expression 8]}$$

In Expression 8, the first term of the sigma operation is ($i \in \omega_k$), and $\mu_k$ and $\sigma_k^2$ are the mean and variance of I in $\omega_k$. $|\omega|$ is the number of pixels in $\omega_k$, and $P_k = \{(1/|\omega|)\Sigma p_i\}$ is the mean of p in $\omega_k$. If the linear coefficients ($a_k$, $b_k$) are acquired, it is possible to obtain the filtering output $q_i$ in accordance with the guided filtering process.

The pixel i is related to all the overlapping windows $\omega_k$ covering I, and $q_i$ in Expression 5 is different when it is calculated in different windows. As an easy method, all the possible values of $q_i$ are averaged. After calculating ($a_k$, $b_k$) with regard to all the windows $\omega_k$, the filtering output is calculated by the following expression.

$$q_i = (1/|\omega|)\Sigma(a_k I_i + b_k) \quad \text{[Expression 9]}$$

In Expression 9, the first term of the sigma operation is ($k | i \in \omega_k$). Due to symmetry of box windows, $\Sigma a_k$ having the first term of ($k | i \in \omega_k$) is equal to $\Sigma a_k$ having the first term of ($k \in \omega_i$), Expression 9 is rewritten as follows.

$$q_i = A_i I_i + B_i \quad \text{[Expression 10]}$$

In Expression 10, $A_i = (1/|\omega|)\Sigma a_k$ and $B_i = (1/|\omega|)\Sigma b_k$ are average coefficients of all windows of overlapping I. In the sigma operation of both $A_i$ and $B_i$, the first term is ($k \in \omega_i$). As described above, the guided filter is defined in Expression 8 and Expression 10.

Using the guided filter based on the foregoing principle, the image processing apparatus converts an initial texture generated by the patches into a revised texture. Because a correlation between the initial texture and the input image is not guaranteed, an output image generated by combining the initial texture with the input image may involve noise due to the problem of the correlation. Therefore, the image processing apparatus applies the guided filtering to the initial texture as compared with the input image, thereby obtaining the revised texture corresponding to the input image. Like this, the image processing apparatus generates the output image by combining the revised texture and the input image, thereby improving the output image in consistency and a correlation.

Below, a method of converting an image frame of an input image into an image frame of a detail-enhanced output image in the image processing apparatus will be described.

Figure 7:
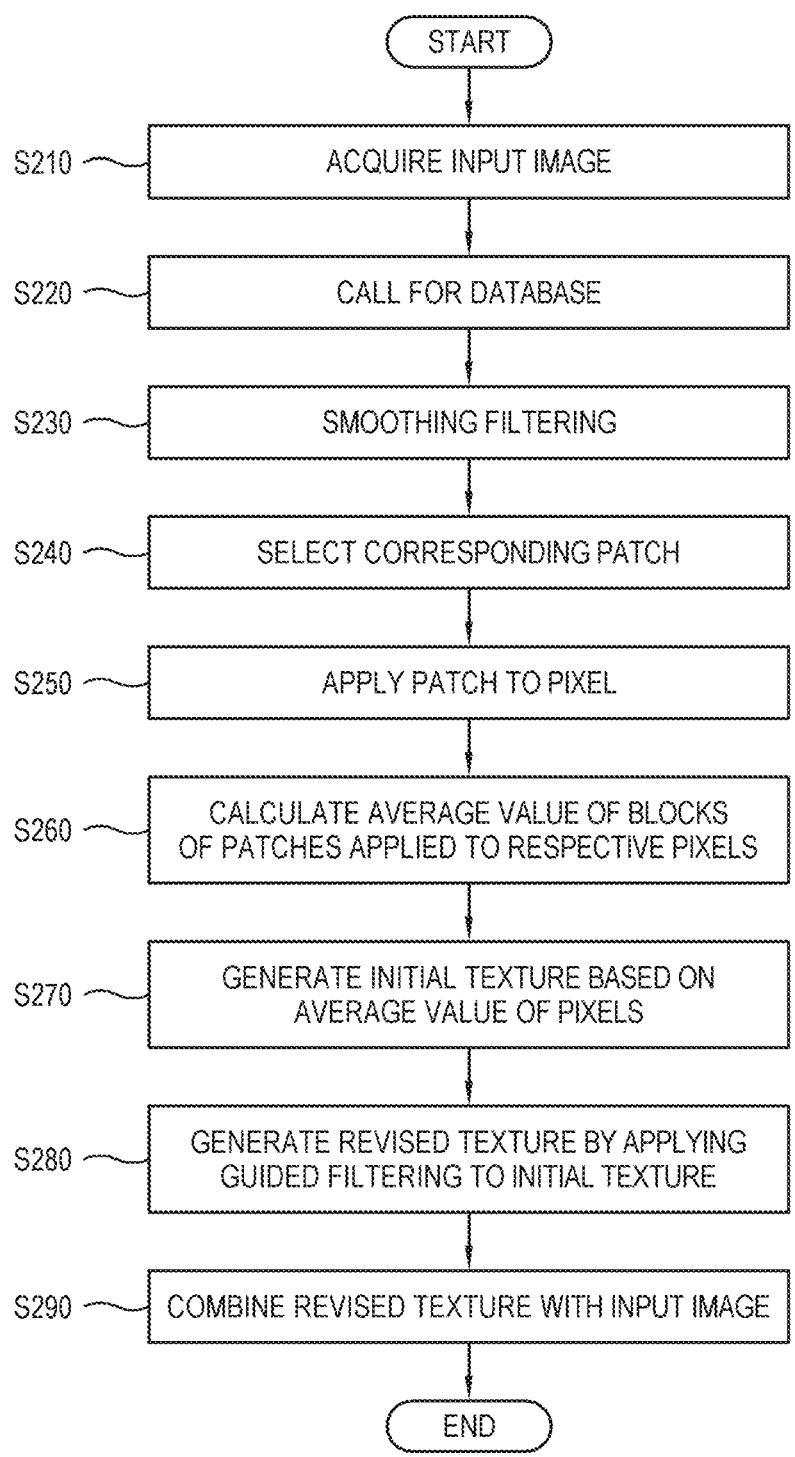
FIG. 7 is a flowchart of improving detail of an image frame of the input image by the image processing apparatus according to an exemplary embodiment.

FIG. 7 is a flowchart illustrating a method of enhancing detail of an image frame of the input image by the image processing apparatus according to an exemplary embodiment.

As shown in FIG. 7, at operation S210 the image processing apparatus acquires an input image. Specifically, the image processing apparatus performs a process of enhancing detail of the input image in units of an image frame.

At operation S220 the image processing apparatus calls for a previously prepared database of patches. The database may be stored in the image processing apparatus, received in the image processing apparatus from an external apparatus or server separated from the image processing apparatus, or newly generated by the image processing apparatus.

At operation S230 the image processing apparatus removes noise from the input image by smoothing filtering. According to an example embodiment, it may be determined if the input image includes little noise, and may skip this operation if the input image includes noise below a threshold amount.

At operation S240 the image processing apparatus selects a patch corresponding to a pixel value of the input image from the database.

At operation S250 the image processing apparatus applies the selected patch to the corresponding pixel.

If the patch is applied to all the pixels, at operation S260 the image processing apparatus calculates the average value of the blocks of the plurality of patches applied to the respective pixels.

At operation S270 the image processing apparatus generates an initial texture based on the calculated average value of the respective pixels.

At operation S280 the image processing apparatus applies guided filtering to the initial texture based on the input image, thereby generating the revised texture.

At operation S290 the image processing apparatus combines the revised texture with the input image.

Thus, the image processing apparatus generates a detail-enhanced output image.

Below, a case where the image processing apparatus according to an exemplary embodiment enhances the detail of the input image will be compared with a case where the image processing apparatus according to a comparison example enhances the detail of the input image.

Figure 8:
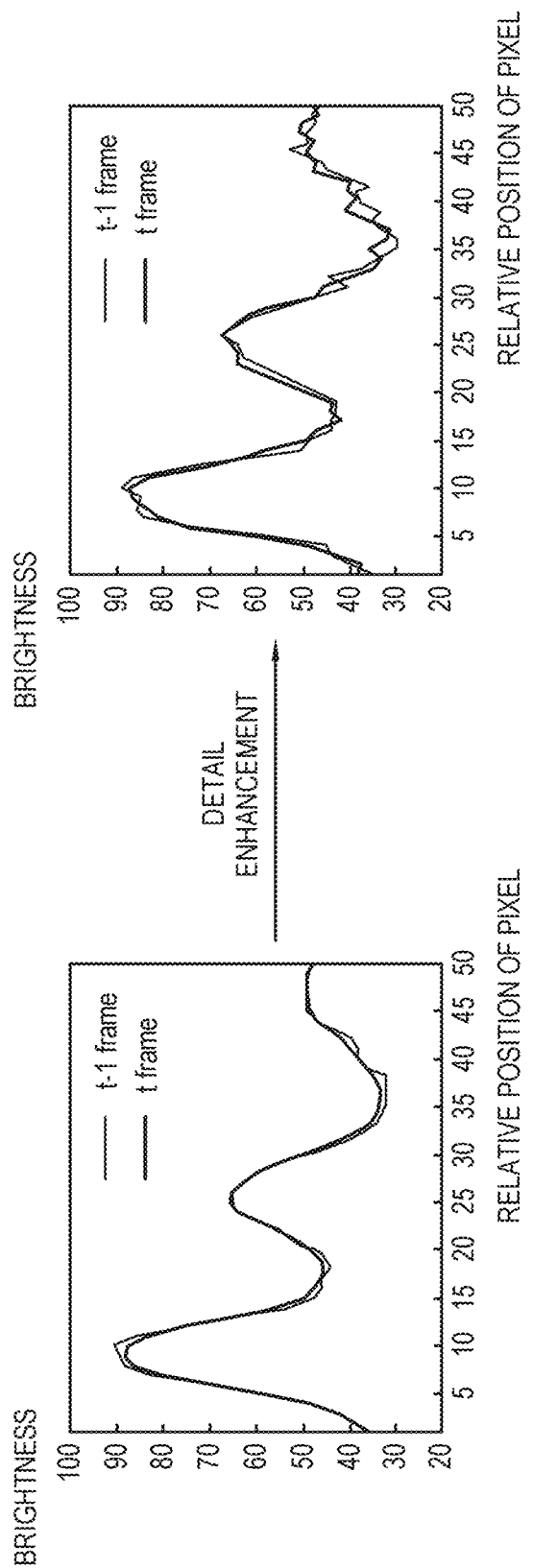
FIG. 8 is a graph of showing change in profile between two image frames adjacent in time to each other when an image processing apparatus converts an input image into an output image.

FIG. 8 is a graph of showing change in profile between two image frames adjacent in time to each other when an image processing apparatus according to the comparison example converts an input image into an output image;

As shown in FIG. 8, the image processing apparatus enhances detail of temporarily successive (t−1) and t frames of the input image. Referring to FIG. 8, the left graph is of the input image, and the right graph is of the detail-enhanced output image. In each graph, an axis of abscissa indicates a relative position of a pixel or an index of a pixel, and an axis of ordinate indicates brightness.

In case of the input image, there is a little difference between the curve of the (t−1) frame and the curve of t frame. As the difference becomes greater, a user perceives a flicker more conspicuously. The output image shows rougher curves than the input image because high-frequency components of the input image are added or amplified. The difference between the curve of the (t−1) frame and the curve of t frame in the output image is greater than that in the input image. Therefore, a user perceives a flicker more conspicuously.

In contrast, the image processing apparatus according to an exemplary embodiment makes little difference between the curve of the (t−1) frame and the curve of t frame. This shows that the consistency and correlation of the image frame are not lowered by the detail enhancement, and therefore the flicker and noise are minimized while a user views the output image.

Below, a method of visually checking a database of a patch in the image processing apparatus according to an exemplary embodiment will be described.

Figure 9:
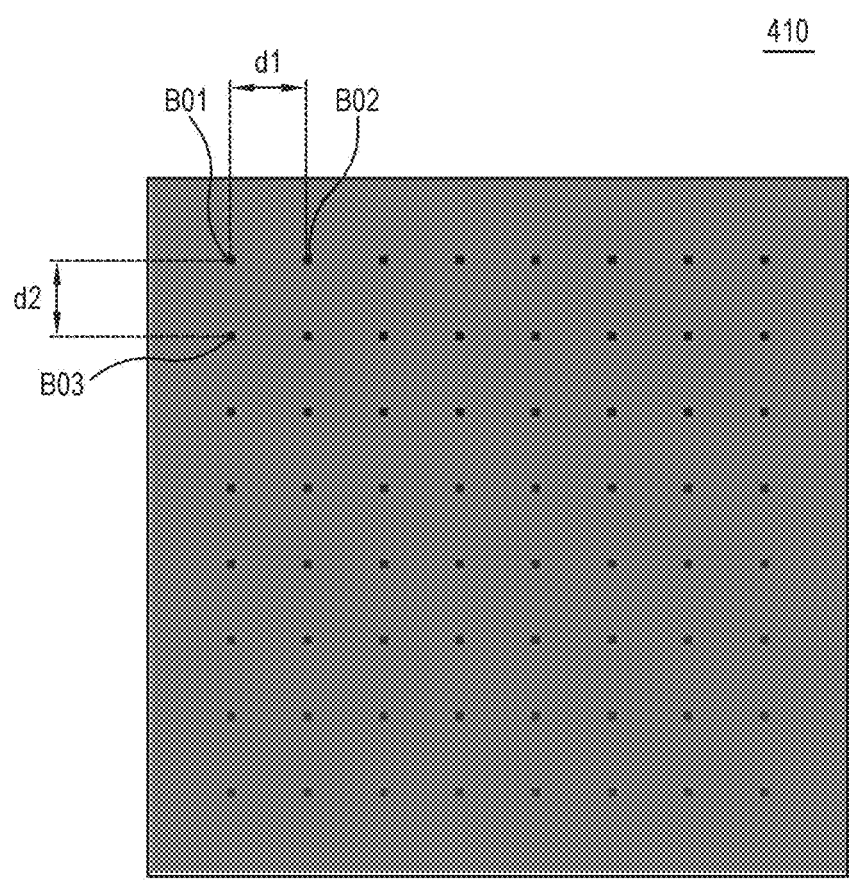
FIG. 9 shows an example of an input image for displaying the database of the patch in the image processing apparatus according to an exemplary embodiment.

FIG. 9 shows an input image 410 for displaying the database is provided to visually check the database of the patch.

The input image 410 has a structure as follows. The input image 410 has a solid-color background such as a white background. On such a background, a plurality of dots, each including one pixel, are arranged up, down, left and right direction, separated by a preset space. The pixels of the respective dots are different in a pixel value, and the patch corresponding to the pixel value of the corresponding dot is displayed on a subsequent output image. The input image 410 includes a total of 64 dots, arranged in a grid of 8*8, but exemplary embodiments are not limited thereto. Alternatively, the number of dots may vary depending on the number of patches desired to be checked by a user. Likewise, the dots in the input image 410 have pixel values different from one another.

Here, a distance d1 between two pixels B01 and B02 adjacent to each other in left and right directions, and a distance d2 between two pixel B01 and B03 adjacent to each other in up and down directions are varied depending on the number of blocks included in a certain patch in a row direction and a column direction. In more detail, if one patch includes n*n blocks, each of d1 and d2 has to be longer than (n+1) pixels. For example, if a patch includes 7*7 blocks, each of d1 and d2 in the input image 410 has to be longer than 8 pixels. If each of d1 and d2 is shorter than n pixels, two adjacent patches are overlapped with each other in the subsequent output image. If each of d1 and d2 is equal to n pixels, two adjacent patches are in contact with each other without any boundary, and it is therefore difficult to distinguish between the two patches.

In this exemplary embodiment, the dots in the input image 410 are arranged in a matrix form at equidistant intervals, but exemplary embodiments are not limited thereto. Alternatively, the dots in the input image 410 may be freely arranged, as long as the dots the input image 410 are separated enough to make two adjacent patches not overlap with each other in the subsequent output image.

Figure 10:
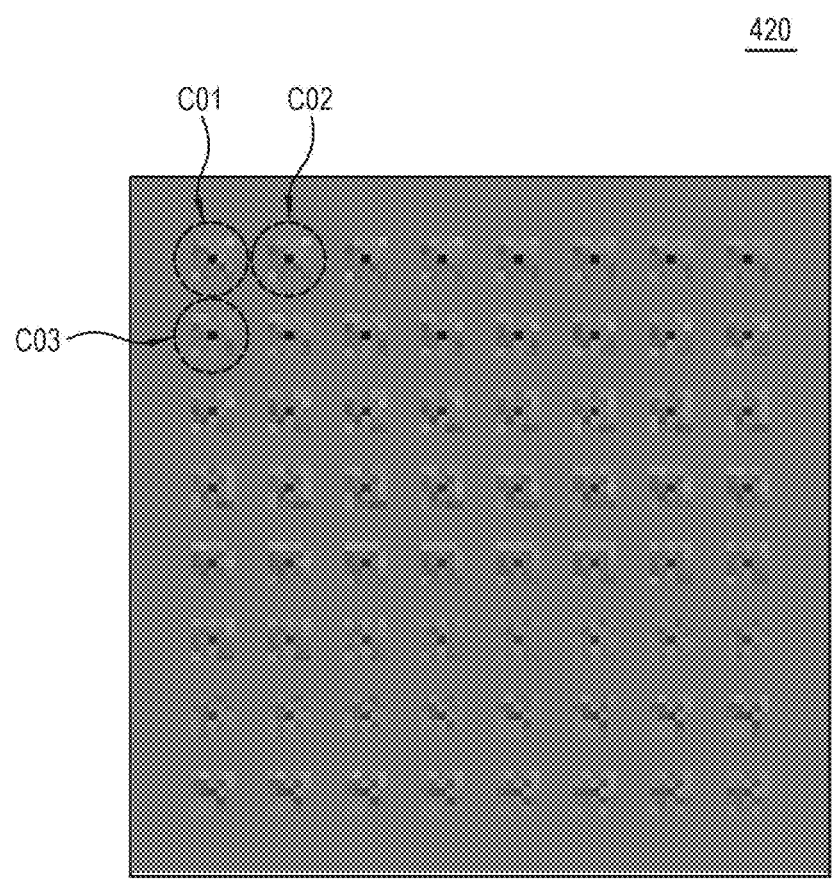
FIG. 10 shows an example of an output image displayed based on the input image of FIG. 9 in the image processing apparatus according to an exemplary embodiment.

FIG. 10 shows an example of an output image displayed based on the input image of FIG. 9 in the image processing apparatus according to an exemplary embodiment.

As shown in FIG. 10, the image processing apparatus displays an output image 420 showing a plurality of patches C01, C02 and C03. The patches C01, C02 and C03 of the output image 420 correspond to the dots in the input image 410 of FIG. 9. For example, the patch C01 corresponds to a dot B01, the patch C02 corresponds to a dot B02, and the patch C02 corresponds to a dot B03. Each of the patches C01, C02 and C03 is arranged on the background of the output image 3420 with respect to the corresponding dot of the input image. Referring to FIG. 10, each of the patches C01, C02 and C03 has a simple square form. However, in an actual output image, each of the patches is shown as an original form including a plurality of blocks.

If the image processing apparatus enhances detail of an input image according to an exemplary embodiment, it is possible to visually determine whether there are the patches C01, C02 and C03 corresponding to the pixel values and what content the patches C01, C02 and C03 have, in such a manner.

Below, if there is a patch, a method of determining whether the patch is generated based on a random number is as follows.

Figure 11:
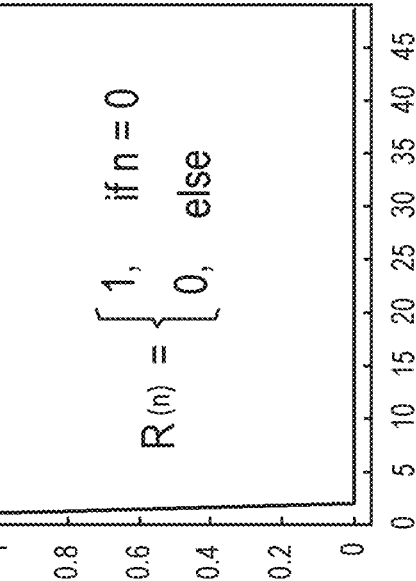
FIG. 11 is a principle of determining whether the patch used in the image processing apparatus is generated based on a random number.
Figure 11:
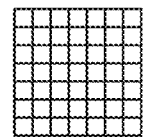

FIG. 11 is a principle of determining whether the patch used in the image processing apparatus is generated based on a random number.

As shown in FIG. 11, to determine whether a certain patch is generated based on an arbitrary value, it is required to make no correction between values of the blocks in the patch, i.e., patch values. Of course, the patch values in one patch are selected under a specific condition as described above, but the values are randomly selected one by one.

If a predetermined patch $X_t$ is given, $R(n)$ may be calculated based on an auto-correlation in order to obtain a correlation coefficient of patch values in the patch. In a formula of $R(n)$, E is an expected value operator, $\mu$ is an average value, and $\sigma$ is a variance. In the formula of $R(n)$, $X_{(t+n)}$ shows that $X_t$ is moved as many as n pixels, and thus indicates the patch itself if t=0.

If a certain block has a correlation of 1 with itself and substantively has a correlation of 0 with the other blocks, the patch is generated based on a random number. On the other hand, if a certain block has a non-zero correlation that is a predetermined value or higher than the other blocks, the patch is not generated based on a random number.

Figure 12:
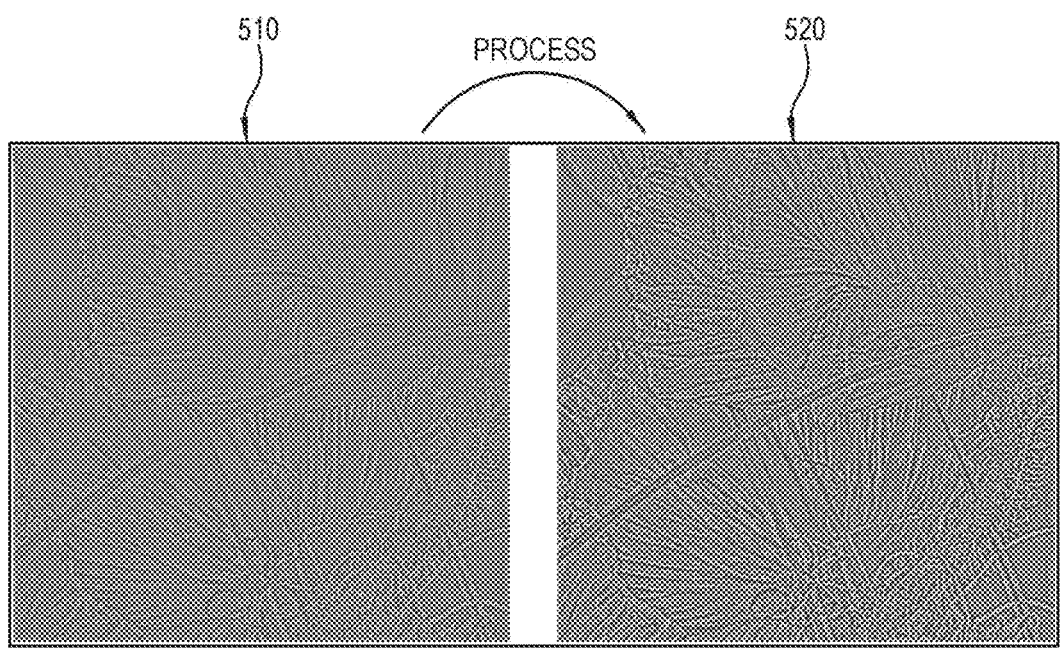
FIG. 12 shows high frequency components for comparison between the input image and the output image processed by the image processing apparatus according to an exemplary embodiment.

FIG. 12 shows high frequency components for comparison between the input image and the output image processed by the image processing apparatus according to an exemplary embodiment.

As shown in FIG. 12, an image 510, in which high-frequency components are extracted from the input image before being processed by the image processing apparatus according to an exemplary embodiment, shows a contour of an object in an approximately solid-color background. This is because the high-frequency components are likely to be noticeably shown at an edge of the image.

If the image processing apparatus according to an exemplary embodiment processes the input image, the high-frequency components of the input image are enhanced in detail. Therefore, an image 520 obtained by extracting the high-frequency components from the output image is more enhanced in detail of the contour of the object than the image 510.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer) readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
a signal receiver configured to receive an input image;
an image processor configured to process the input image and generate an output image;
a storage configured to store a plurality of patches respectively corresponding to a plurality of pixel values; and
a controller configured to control the image processor to generate the output image by identifying a first patch from the plurality of patches based on a first pixel value of a first pixel of the input image, and applying the first patch to the first pixel,
wherein each of the plurality of patches comprises a plurality of pixels and has an average pixel value which is same as those of other patches.

2. The image processing apparatus according to claim 1, wherein the plurality of pixels in the first patch respectively correspond to pixels in pixel area including the first pixel in the input image, and
wherein the plurality of pixels in the first patch respectively has arbitrary value obtained by the random number algorithm.

3. The image processing apparatus according to claim 2, wherein the controller is further configured to apply the first patch from among the plurality of patches to the pixel area larger than the first pixel such that the plurality of pixels in the first patch respectively is applied to the pixels in the pixel area including the first pixel.

4. The image processing apparatus according to claim 3, wherein the first patch is configured to be applied to the pixel area having a matrix form of 7*7.

5. The image processing apparatus according to claim 3, wherein the controller is further configured to apply the plurality of patches to respective pixels of the input image such that the plurality of patches overlap, and generate the output image by calculating an average of a plurality of overlapping patch values with regard to the respective pixels.

6. The image processing apparatus according to claim 2, wherein values of the plurality of pixels within one of the plurality of patches has a correlation of 0 therebetween.

7. The image processing apparatus according to claim 2, wherein part patches of the plurality of patches are generated based on the random number algorithm, and
wherein remaining patches of the plurality of patches are generated based on linear interpolation applied between the part patches.

8. The image processing apparatus according to claim 2, wherein the controller is further configured to convert a texture generated by applying the plurality of patches to respective pixels of the input image into a revised texture through guided filtering based on the input image, and generate the output image by combining the input image with the revised texture.

9. The image processing apparatus according to claim 1, wherein the controller is further configured to apply a smoothing filter to the input image, and respectively apply the plurality of patches to the input image which has been subject to the smoothing filter.

10. A non-transitory recording medium for storing a program code of a method executable by a processor of an image processing apparatus, the method comprising:

receiving an input image;
obtaining a plurality of patches respectively corresponding to a plurality of pixel values; and
generating an output image by identifying a first patch from the plurality of patches based on a first pixel value of a first pixel of the input image and applying the first patch to the first pixel,
wherein each of the plurality of patches comprises a plurality of pixels and has an average pixel value which is same as those of other patches.

11. The non-transitory recording medium according to claim 10, wherein the plurality of pixels in the first patch respectively correspond to pixels in pixel area including the first pixel in the input image, and
wherein the plurality of pixels in the first patch respectively has arbitrary value obtained by the random number algorithm.

12. The non-transitory recording medium according to claim 11, wherein the first patch from among the plurality of patches is applied to the pixel area larger than the first pixel such that the plurality of pixels in the first patch respectively is applied to the pixels in the pixel area including the first pixel.

13. The non-transitory recording medium according to claim 12, wherein the first patch is provided to be applied to the pixel area having a matrix form of 7*7.

14. The non-transitory recording medium according to claim 12, wherein the generating the output image comprises:
applying the plurality of patches to respective pixels of the input image such that the plurality of patches overlap; and
generating the output image by calculating an average of a plurality of overlapping patch values with regard to the respective pixels.

15. The non-transitory recording medium according to claim 11, wherein values of the plurality of pixels within one of the plurality of patches has a correlation of 0 therebetween.

16. The non-transitory recording medium according to claim 11, wherein part patches of the plurality of patches are generated based on the random number algorithm, and
wherein remaining patches of the plurality of patches are generated based on linear interpolation applied between the part patches.

17. The non-transitory recording medium according to claim 10, wherein the generating the output image comprises:
converting a texture generated by applying the plurality of patches to respective pixels of the input image into a revised texture through guided filtering based on the input image; and
generating the output image by combining the input image with the revised texture.

18. The non-transitory recording medium according to claim 10, wherein the generating the output image comprises:
applying a smoothing filter to the input image; and
respectively applying the patches to the input image which has been subject to the smoothing filter.

* * * * *